Patented Nov. 17, 1925.

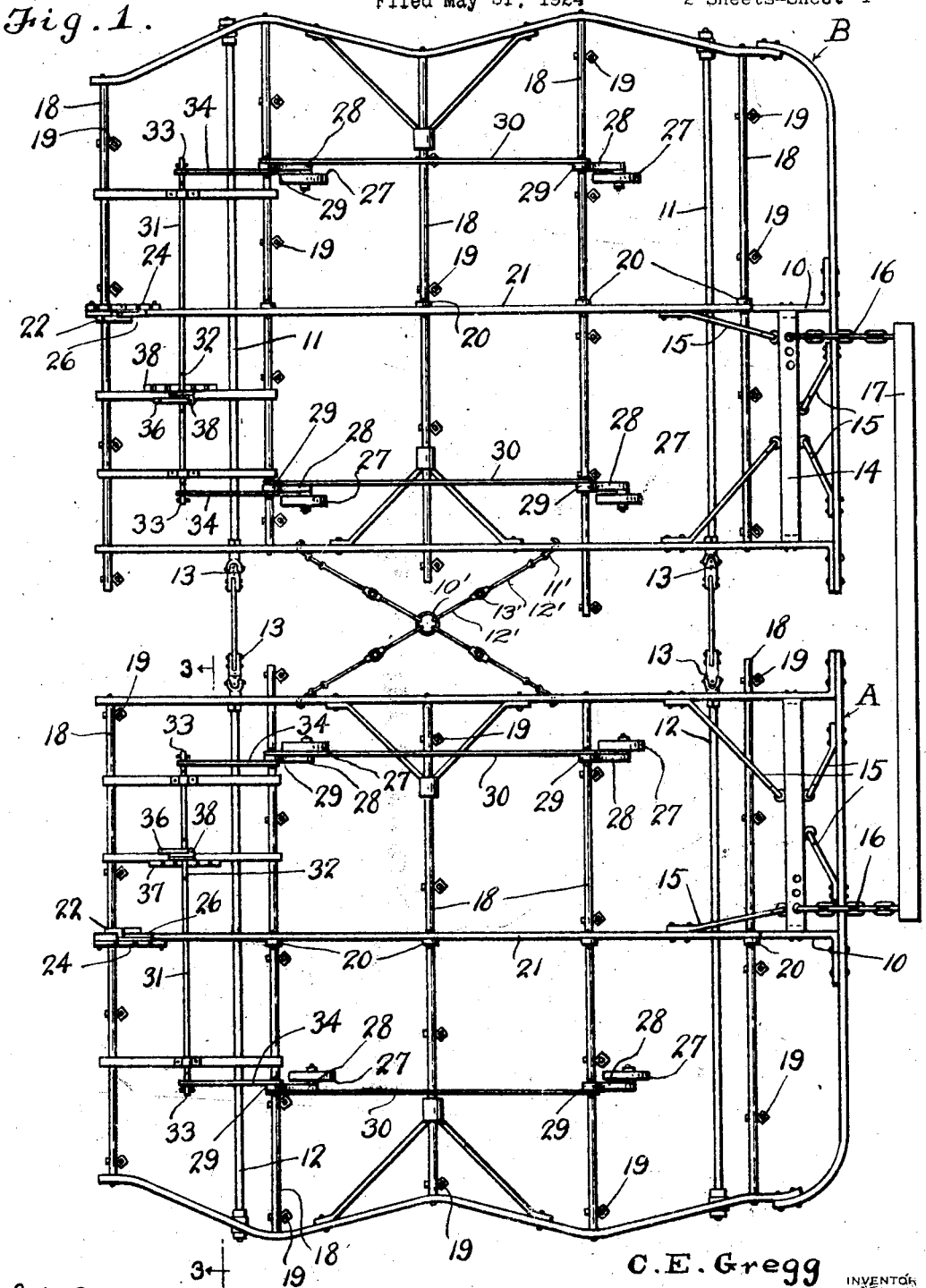

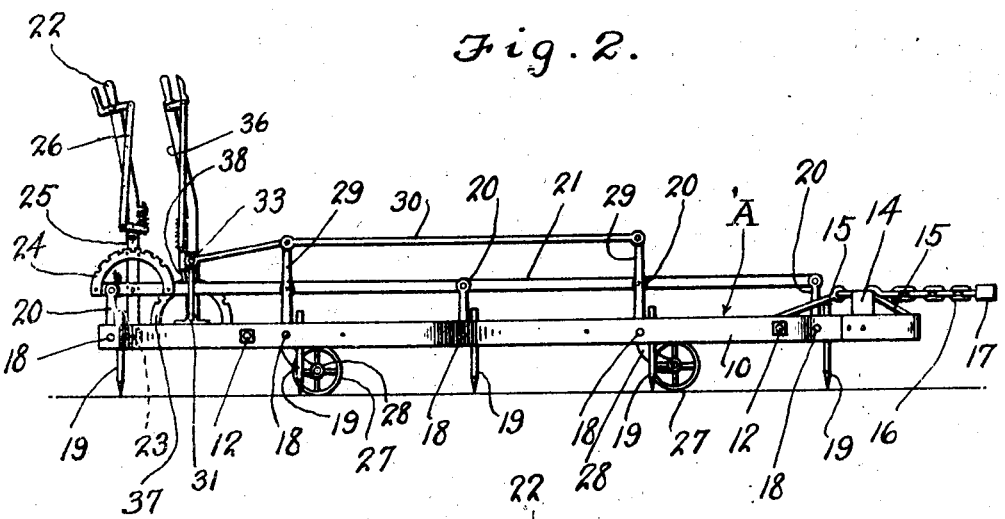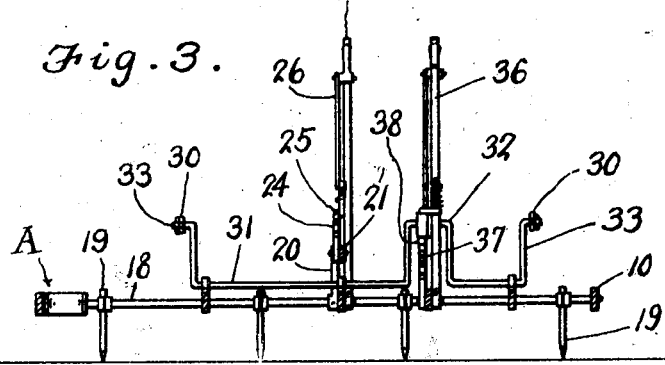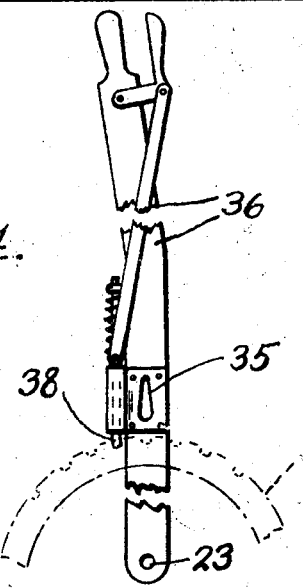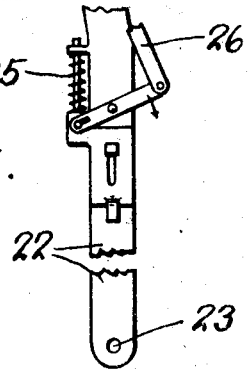

1,561,849

UNITED STATES PATENT OFFICE.

CHARLES EDWARD GREGG, OF JEFFERSON, PENNSYLVANIA.

HARROW.

Application filed May 31, 1924. Serial No. 717,176.

*To all whom it may concern:*

Be it known that I, CHARLES EDWARD GREGG, a citizen of the United States, residing at Jefferson, in the county of Greene and State of Pennsylvania, have invented new and useful Improvements in Harrows, of which the following is a specification.

This invention relates to harrows, wherein use is made of a plurality of toothed pulverizing bars mounted upon a selected frame, with means for adjusting all of the bars to vary the angle or inclination of the teeth with relation to the ground, and also means for adjusting the wheels, whereby the depth of the cut made in the ground by said teeth can be regulated.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views and wherein Figure 1 is a top plan view, Figure 2 is a side elevation, Figure 3 is a sectional view taken on the line 3—3 of Figure 1.

Figure 4 is a detail view of the lever utilized to adjust the wheels,

Figure 5 is a fragmentary view of the lever utilized for adjusting the pulverizing rods.

Referring to the drawings in detail, A and B represent a sectional harrow, each section consisting of a substantially rectangular frame including an intermediate longitudinally disposed member 10. These sections are arranged in spaced parallel relation and are associated by shafts 11 and 12 respectively, the adjacent ends of these shafts being arranged in the space between the respective sections and coupled together as at 13 in a manner to provide for a pivotal connection between said sections. Consequently when the harrow is in use, the sections are susceptible of independent pivotal movement so that the sections can be effectively used over irregular surfaces. Supported on each frame at one of the foremost corners thereof is a transverse element 14 constituting a draft head which is suitably braced by diagonally disposed bracing elements 15. These elements 14 of the respective sections have terminally secured thereto chains 16 which support a draft bar 17.

Each frame has journaled thereon and arranged transversely thereof a plurality of spaced parallel pulverizing bars 18, each bar having associated therewith in any suitable manner a series of pulverizing teeth 19. These teeth 19 depend from each bar 18 and of course are adapted to contact with the surface to perform the function attributed to the bars, but in order to allow the teeth to be arranged at different angles or inclinations with respect to the ground, as the occasion may require. I provide each bar with an upstanding lug 20 preferably arranged centrally of the bar, and all of these lugs are bolted or otherwise suitably secured to a connecting bar 21. This bar is arranged longitudinally of the frame and is connected by a slot and pin connection with a manually operable lever 22 arranged adjacent the rear end of the machine. The lever 22 is pivoted as at 23, and moves alongside of a segmental rack 24 with which the spring pressed pawl 25 cooperates to hold the lever 22 fixed in any given position. The pawl 25 is controlled by an auxiliary lever 26 associated with the lever 22 in the ordinary well known manner.

The frame of each section is mounted on wheels 27, each wheel being journaled in a yoke 28 formed with an upstanding shank 29, and these shanks are loosely mounted on the adjacent bars 18. The wheels are arranged in pairs as clearly illustrated in Figure 1. Connecting the shanks 29 of each pair of wheels is a connecting bar 30, and these bars are to adjust all of the wheels at the same time in a manner to be presently described. For this purpose I make use of a crank shaft 31 having an intermediate crank portion 32 and crank like extremities 33, the latter being connected with the adjacent shanks 29 of the wheel yokes through the instrumentality of links 34, which are arranged to form a continuation of the bars 30. The crank portion 32 passes through a slot 35 of a manually operable lever 36 which is pivoted adjacent a segmental rack 37. The lever is equipped with a spring pressed pawl 38 which co-operates with this rack to hold the lever in any given position.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

I claim:

A harrow including a wheeled frame, a plurality of spaced transversely disposed bars journaled in said frame, a series of teeth carried by each bar and depending therefrom, means including a lever for adjusting said bars to vary the angle of the teeth with relation to the ground, a yoke supporting each of said wheels, each yoke including a shank loosely mounted on one of said bars, said wheels being arranged in pairs, a connecting bar connecting the shanks of each pair of said yokes, a crank shaft journaled on the frame and having crank like extremities, links connecting the extremities with the adjacent yokes and arranged to form a continuation of said connecting bars, and a lever having a slot to receive the crank portion of said shaft, whereby said lever is utilized to adjust said wheels toward and away from the ground for the purpose specified.

In testimony whereof I affix my signature.

CHARLES E. GREGG.